United States Patent
Woo et al.

(10) Patent No.: US 7,786,715 B2
(45) Date of Patent: Aug. 31, 2010

(54) DC/DC CONVERTER

(75) Inventors: Young-Jin Woo, Daejeon (KR);
Gyu-Ha Cho, Daejeon (KR)

(73) Assignee: JDA Technology Co., Ltd., Daejeon (KR)

( * ) Notice: Subject to any disclaimer, the term of this patent is extended or adjusted under 35 U.S.C. 154(b) by 11 days.

(21) Appl. No.: 12/103,125

(22) Filed: Apr. 15, 2008

(65) Prior Publication Data

US 2008/0252273 A1      Oct. 16, 2008

(30) Foreign Application Priority Data

Apr. 16, 2007   (KR) .................. 10-2007-0037137

(51) Int. Cl.
*G05F 1/40*         (2006.01)
*G05F 1/10*         (2006.01)
(52) U.S. Cl. ...................................... 323/282; 323/288
(58) Field of Classification Search ......... 323/222–225, 323/268, 271, 272, 282, 285, 288

See application file for complete search history.

(56) References Cited

U.S. PATENT DOCUMENTS

| | | | |
|---|---|---|---|
| 6,271,651 B1 * | 8/2001 | Stratakos et al. | 323/282 |
| 6,784,644 B2 * | 8/2004 | Xu et al. | 323/225 |
| 6,879,136 B1 * | 4/2005 | Erisman et al. | 323/282 |
| 2009/0115388 A1 * | 5/2009 | Miyazaki et al. | 323/282 |
| 2009/0146620 A1 * | 6/2009 | Ng et al. | 323/222 |

* cited by examiner

*Primary Examiner*—Matthew V Nguyen
(74) *Attorney, Agent, or Firm*—Pryor Cashman LLP; Barry E. Negrin (57) ABSTRACT

The present invention is related to a dc/dc converter. A dc/dc converter according to the present invention comprises an inductor, a switch unit connected to both ends of the inductor and charging or retrieving an energy into the inductor, an output unit comprising an output switch unit outputting the energy charged in the inductor into an output end and a first comparison unit controlling an on-off of the output switch unit, a freewheeling switch unit connected to both ends of the inductor and returning a residual current remained in the inductor, a current sense unit sensing the residual current, an offset current generation unit generating an offset current, an error amplifier comparing the residual current inputted from the current sense unit to the offset current generated in the offset current unit and outputting the error signal, and a control unit controlling the switch unit with the error signal inputted from the error amplifier.

27 Claims, 9 Drawing Sheets

DC/DC CONVERTER

This non-provisional application claims priority under 35 U.S.C. §119(a) on patent application Ser. No. 10-2007-0037137 filed in Republic of Korea on April 16, the entire contents of which are hereby incorporated by reference.

BACKGROUND

Field

This invention relates to a dc/dc converter.

A dc/dc converter is a circuit which boosts or bucks an input voltage and outputs it to an output unit. This dc/dc converter is an essential composition element which is composed of various electronic machines of a portable electronic machine, a display, etc.

Figure 1:
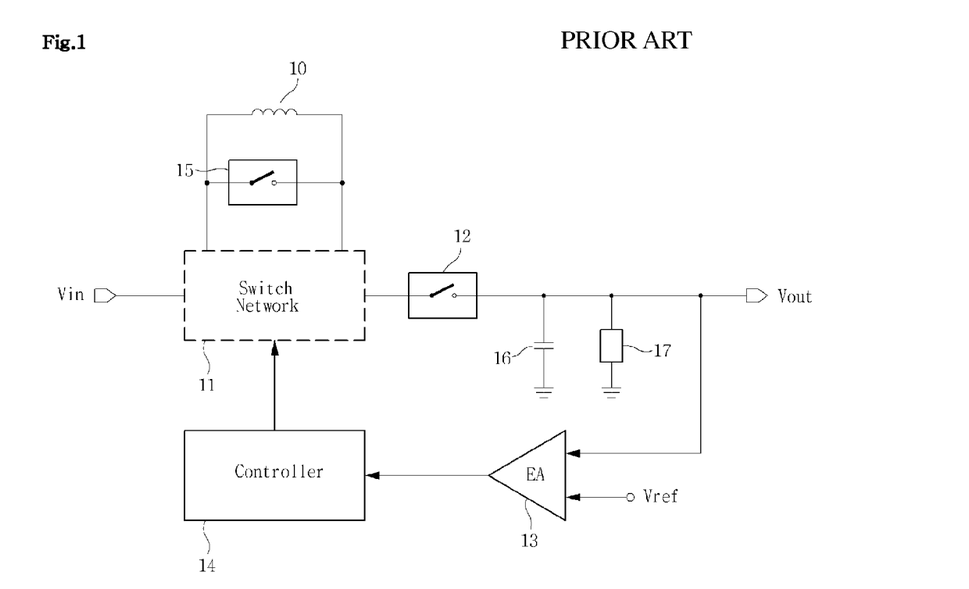
FIG. 1 illustrates a conventional dc/dc converter having a negative feedback control of an output voltage.

FIG. 1 illustrates a conventional dc/dc converter having a negative freewheeling control of an output voltage. As illustrated in FIG. 1, the conventional dc/dc converter is configured with an inductor 10, a switch unit 11 connected to both ends of the inductor 10 and charging or retrieving an energy for the inductor 10, an output switch unit 12 outputting an energy stored in the inductor 10, an error amplifier 13 having a negative freewheeling control of an output voltage Vout, a control unit 14 controlling the switch unit 11, a capacitor 16 and a load 17, and boosts or bucks the output voltage Vout and controls it into a target voltage.

According to the conventional dc/dc converter, it has problems; 1) the characteristic of the load 17 has an effect on that of a control loop and the plan of the controller is difficult, 2) a response regarding the fluctuation of an input voltage Vin or the load is slow; 3) an output voltage can not be provided stably.

SUMMARY

A purpose of this invention is to provide a dc/dc converter which a characteristic of a load does not have an effect on that of a control loop.

Another purpose of the present invention is to provide a dc/dc converter responding fast against the fluctuation of an input voltage or a load.

Another purpose of the present invention is to provide a dc/dc converter which can provide an output voltage stably.

A dc/dc converter according to the present invention comprises an inductor; a switch unit connected to both ends of the inductor; an output unit comprising an output switch unit outputting the energy charged in the inductor into an output end and a first comparison unit controlling an on-off of the output switch unit; a freewheeling switch unit connected to both ends of the inductor and returning a residual current remained in the inductor; a current sense unit sensing the residual current; an offset current generation unit generating an offset current; an error amplifier comparing the residual current inputted from the current sense unit to the offset current generated in the offset current unit and outputting the error signal; and a control unit controlling the switch unit by using an error signal inputted from the error amplifier.

The switch unit may connect electrically one end of the inductor to an input end and the other end of the inductor to an output switch unit, and one end of a first switch connected electrically between the other end of the inductor and the output switch unit.

The control unit may control an on-off of the first switch.

The switch unit may be that a first switch is connected electrically between the one end of inductor and an input end, and a second switch is connected electrically between the one end of the inductor and a ground voltage, and connects electrically the other one of inductor and the output switch unit.

The control unit may control an on-off of the first switch and the second switch.

The switch unit may be that a first switch is connected electrically between the one end of inductor and an input end, and a second switch is connected electrically between the one end of inductor and a ground voltage, and connects electrically the other one of inductor and the output switch unit, and a third switch is connected between the other end of the inductor and the ground voltage.

The control unit may control the first switch, the second switch, and the third switch.

The output unit may be connected over two parallel.

The offset current generation unit comprises a trans-conductance amplifier.

The offset current generation unit may comprise a second comparison unit comparing the output voltage of the output end to an pre-determined reference voltage and outputting a comparison signal; a control logic unit outputting a control signal by using the comparison signal inputted from the second comparison unit; and a digital-analog converter generating the offset current by using the control signal inputted from the control logic unit.

A dc/dc converter according to another embodiment of the present invention comprises an inductor; a switch unit connected to both ends of the inductor; an output unit comprising an output switch unit outputting the energy charged in the inductor into an output end and a first comparison unit controlling an on-off of the output switch unit; a control switch unit connected electrically to the inductor; a capacitor unit connected to the control switch unit and storing an energy remained in the inductor; a load unit consuming an energy stored in the capacitor unit; an error amplifier comparing both-ends voltage of the capacitor unit inputted from the capacitor unit to a reference voltage and outputting an error signal; and a control unit controlling the switch unit by using the error signal inputted from the error amplifier.

The dc/dc converter further comprises a freewheeling switch unit connected to both ends of the inductor.

The switch unit may connect electrically one end of the inductor to an input end and the other end of the inductor to an output switch unit, and one end of a first switch connected electrically between the other end of the inductor and the output switch unit.

The control unit may control an on-off of the first switch.

The switch unit may be that a first switch is connected electrically between the one end of inductor and an input end, and one end of a second switch is connected electrically between the one end of inductor and the first switch, and connects electrically the other one of inductor and the output switch unit.

The control unit may control an on-off of the first switch and the second switch.

The switch unit may be that a first switch is connected electrically between the one end of the inductor and an input end, and one end of a second switch is connected electrically between the one end of the inductor and the first switch, and connects electrically the other one of inductor and the output switch unit, and one end of a third switch is connected between the other end of inductor and the output switch unit.

The control unit may control the first switch, the second switch, and the third switch.

The output unit may be connected over two parallel.

A dc/dc converter according to another embodiment of the present invention comprises a transformer; a switch unit connected electrically to a primary coil of the transformer and charging an energy; an output unit comprising an output switch unit transferring a energy charged in a secondary coil of the transformer and a comparison unit controlling the output switch unit; a regulation switch unit connected electrically to the secondary coil; a capacitor unit connected electrically to the regulation switch unit and storing an energy remained in the secondary coil; a load unit consuming an energy stored in the capacitor unit; an error amplifier comparing both-ends voltage of the capacitor unit inputted from the capacitor unit to a reference voltage and outputting an error signal; and a control unit controlling the switch unit by using the error signal inputted from the error amplifier.

The load unit comprises a linear voltage regulator outputting a control voltage by using a stored energy of the capacitor unit inputted from the capacitor unit.

The output unit may be connected over two parallel.

A dc/dc converter according to another embodiment of the present invention comprises an inductor; a switch unit connected to both ends of the inductor; an output unit comprising an output switch unit outputting the energy charged in the inductor into an output end and a comparison unit controlling an on-off of the output switch unit; a regulation switch unit connected electrically to the inductor; a capacitor unit connected to the control switch unit and storing an energy remained in the inductor; a recovery converter recovering an energy stored in the capacitor unit to an input end; an error amplifier comparing both-ends voltage of the capacitor unit inputted from the capacitor unit to a reference voltage and outputting an error signal; and a control unit controlling the switch unit by using the error signal inputted from the error amplifier.

The dc/dc converter further comprises a freewheeling switch unit connected to both ends of the inductor.

The switch unit may connect electrically one end of the inductor to an input end and the other end of the inductor to an output switch unit, and one end of a first switch connected electrically between the other end of the inductor and the output switch unit.

The control unit may control an on-off of the first switch.

The output unit may be connected over two parallel.

BRIEF DESCRIPTION OF THE DRAWINGS

The implementation of this invention will be described in detail with reference to the following drawings in which like numerals refer to like elements.

DETAILED DESCRIPTION

Hereinafter, an implementation of this invention will be described in detail with reference to the attached drawings.

Figure 2:
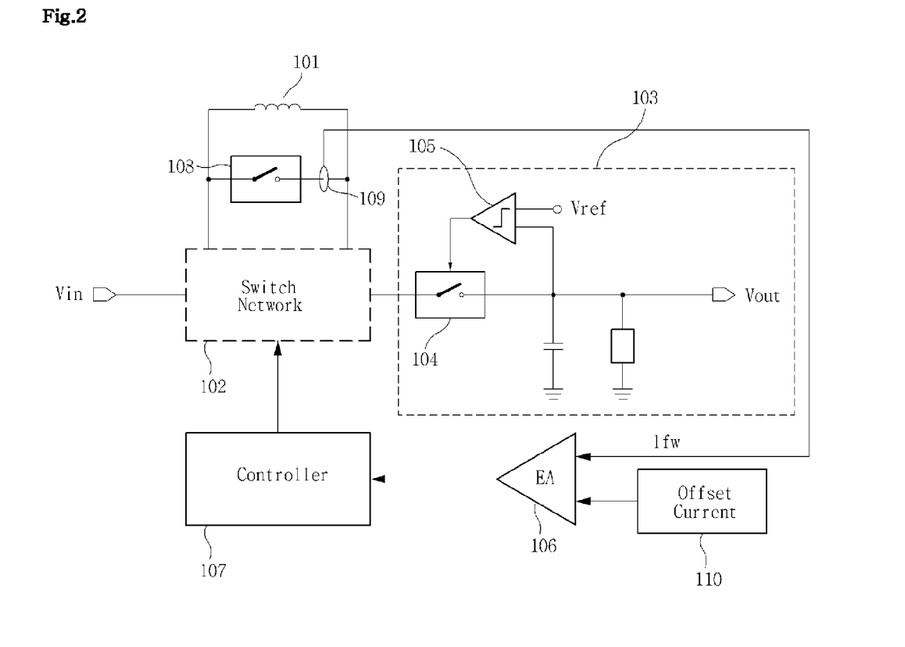
FIG. 2 illustrates a dc/dc converter having a negative feedback control of a residual energy of a current type according to a first embodiment of the present invention.

FIG. 2 illustrates a dc/dc converter having a negative feedback control of a residual energy of a current type according to a first embodiment of the present invention.

As illustrated in FIG. 2, the dc/dc converter having a negative feedback control of a residual energy of a current type according to a first embodiment of the present invention comprises an inductor 101, a switch unit 102, an output unit 103 comprising a switch unit 104 and a comparison unit 105, an error amplifier 106, a control unit 107, a freewheeling switch unit 108, a current sense unit 109 and an offset current generation unit 110.

The inductor 101 stores an energy provided from an input end Vin by the switch unit 102 illustrated later.

The switch unit 102 is connected electrically to both ends of the inductor 101 and controls a serial voltage provided from the input end Vin and charges or discharges an energy into the inductor 101.

The output unit 103 comprises an output switch unit 104 and a first comparison unit 105.

One end of the output switch unit 104 is connected electrically to the switch unit 102, and the other end is connected electrically to the output end Vout. This output switch unit 104 controls for outputting an energy charged in the inductor 101 into the output end Vout.

The first comparison unit 105 is inputted an output voltage of the output end Vout to an reference voltage and compares these, and controls the output switch unit 104 to be off when the output voltage is larger than the reference voltage.

The freewheeling switch unit 108 is connected electrically to both ends of the inductor 101 and returns a residual energy remained in the inductor 101.

The current sense unit 109 is connected to one end of the freewheeling switch unit 108 and senses the residual current.

The offset current generation unit 110 generates an offset current.

The error amplifier 106 compares the residual energy Ifw sensed in the current control unit 109 to the offset current generated in the offset current unit 110 and outputs an error signal and provides it to the control unit 107.

The control unit 107 controls an on-off of the switch unit 102 by using the error signal inputted from the error amplifier 106.

It illustrates a concrete operation of the dc/dc converter having a negative feedback control of a residual energy of a current type according to a first embodiment of the present invention. When an input voltage is inputted to the input end Vin, an energy is charged in the inductor 101 by the switch unit 102. The energy charged in the inductor 101 is transferred to the output end Vout through the output switch unit 104, and the first comparison unit 105 compares the output voltage of the output end Vout to the reference voltage Vref and controls the output switch unit 104 to be off when the output voltage is larger than the reference voltage. If it controls the freewheeling switch unit 108 on after making the output switch unit to be off, the residual current is returned through the free return current switch unit. In this time, the current sense unit 109 senses the residual current returned and transfers it to an input of error amplifier 106 (EA). The error amplifier 106 has a negative feedback control for equalizing an average value of the residual current with an offset current, with the residual current lfw and the offset current inputted, and outputs an error signal. The control unit 107 controls an on-off of the switch unit 102 in the way of PWM (Pulse Width Modulation) or PFM (Pulse Frequency Modulation) by using an error signal inputted from the error amplifier 106, and provides a direct current voltage to the output end.

The dc/dc converter having a negative feedback control of a residual energy of a current type according to a first embodiment of the present invention configured as above is that the current sense unit 109 senses the residual current returned and has a negative feedback control of the error amplifier 106 and the control unit 107. Thus the characteristic of the load has no effect on a negative feedback loop, and it can respond fast to an fluctuation of the input voltage or the load and provide an output voltage stably.

Figure 3:
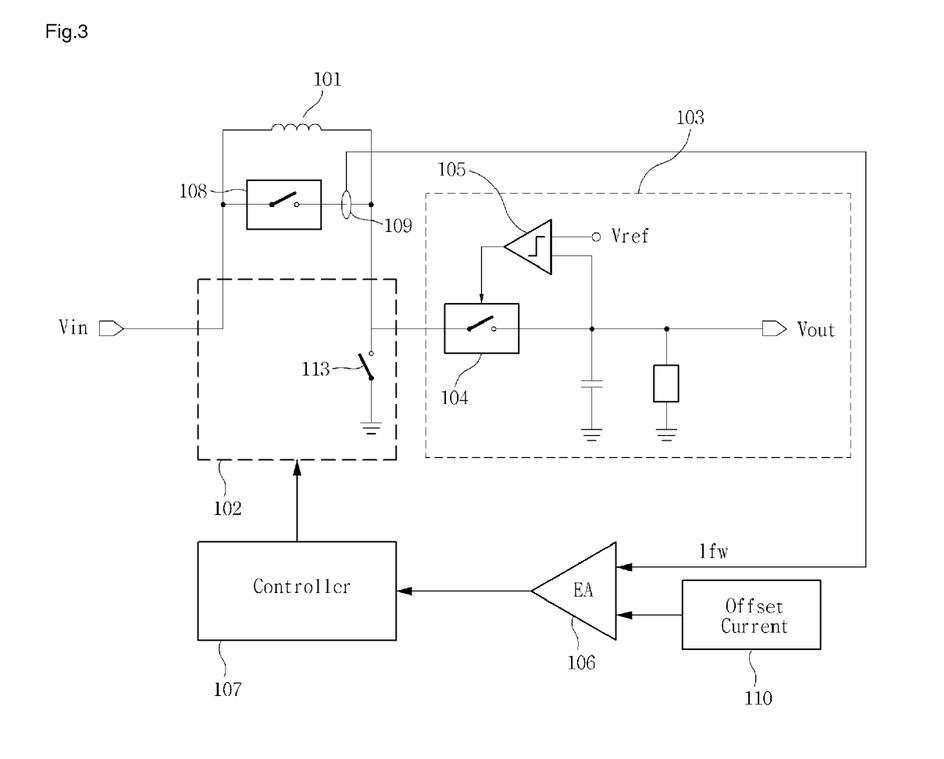
FIG. 3 illustrates a boost type dc/dc converter having a negative feedback control of a residual energy of a current type according to another embodiment of the present invention.

FIG. 3 illustrates a boost type dc/dc converter having a negative feedback control of a residual energy of a current type according to another embodiment of the present invention.

As illustrated in FIG. 3, a boost type dc/dc converter having a negative feedback control of a residual energy of a current type according to another embodiment of the present invention comprises an inductor 101, a switch unit 102, an output unit 103 comprising a switch unit 104 and a first comparison unit 105, an error amplifier 106, a control unit 107, a freewheeling switch unit 108, a current sense unit 109 and an offset current generation unit 10.

The switch unit 102 connects electrically one end of the inductor 101 to an input end Vin and the other end of the inductor 101 to the output switch unit 104, and one end of a first switch 113 is connected between the other end of the inductor 101 and the output switch unit 104.

Besides, the other end of the first switch is connected electrically to a ground voltage.

It illustrates a concrete operation of the boost type dc/dc converter having a negative feedback control of a residual energy of a current type according to another embodiment of the present invention. An energy charged in the inductor 101 through the first switch 113 of the switch unit 102 is transferred to an output end Vout through the output switch unit 104. The first comparison unit 105 compares the output voltage to a reference voltage Vref, and controls the output switch unit to be off when the output voltage is larger than the reference voltage. It controls the freewheeling switch unit 108 to be on when the output switch unit 104 is off. In this time, a residual current remained in the inductor 101 through the freewheeling switch unit 108 is returned. The current sense unit 109 senses the residual current and transfers it to an input of the error amplifier 106 (EA). The error amplifier 106 has a negative feedback control for equalizing an average value of the residual current with an offset current by using the residual current lfw and the offset current inputted, and outputs an error signal. The control unit 107 controls an on-off of the switch unit 102 in the way of PWM (Pulse Width Modulation) or PFM (Pulse Frequency Modulation) by using an error signal inputted from the error amplifier 106, and provides a boosted dc voltage to the output end.

Figure 4:
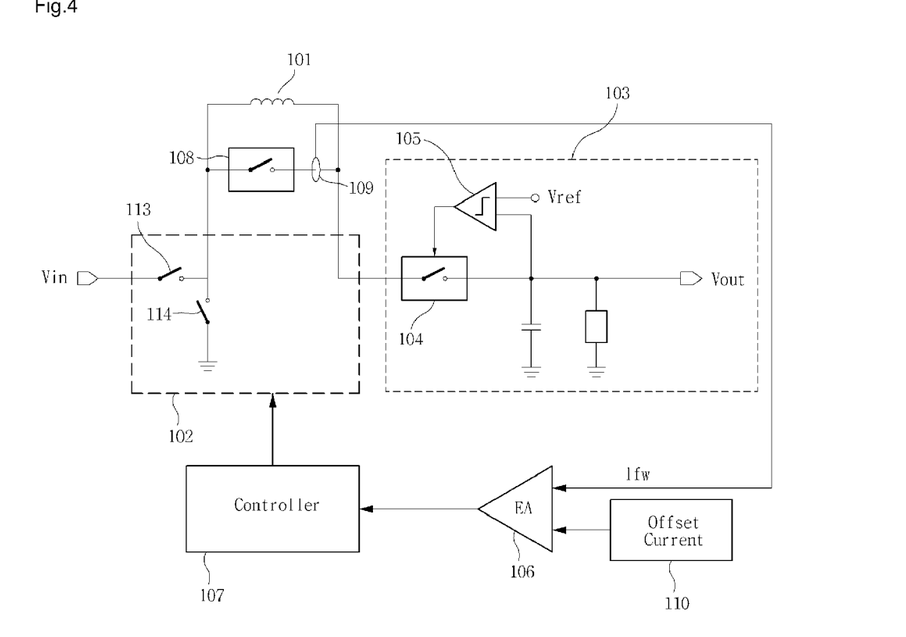
FIG. 4 illustrates a buck type dc/dc converter having a negative feedback control of a residual energy of a current type according to another embodiment of the present invention.

FIG. 4 illustrates a buck type dc/dc converter having a negative feedback control of a residual energy of a current type according to another embodiment of the present invention.

As illustrated in FIG. 4, a buck type dc/dc converter having a negative feedback control of a residual energy of a current type according to another embodiment of the present invention comprises an inductor 101, a switch unit 102, an output unit 103 comprising a switch unit 104 and a first comparison unit 105, an error amplifier 106, a control unit 107, a freewheeling switch unit 108, a current sense unit 109 and an offset current generation unit 10.

The switch unit 102 is that a first switch 113 is connected electrically between one end of the inductor 101 and an input end Vin, and one end of a second switch 114 is connected electrically between the one end of inductor 101 and the first switch 13, and connects the other end of the inductor 101 to the output switch unit 104.

Besides, the other end of second switch 114 is connected electrically to a ground voltage.

It illustrates a concrete operation of the buck type dc/dc converter having a negative feedback control of a residual energy of current type according to a first embodiment of the present invention. If the first switch 113 of the switch unit 102 and the output switch unit 104 is on spontaneously, then an energy is transferred to the output end and charged in the inductor 101. After some hours is elapsed by the control unit 107, the first switch 113 is off, and an energy charged in the inductor 101 is transferred continuously to an output end as the second switch 114 is on. The first comparison 105 compares the output voltage to a reference voltage Vref, and controls the output switch unit to be off when the output voltage is larger than the reference voltage, and controls the freewheeling switch unit 108 to be on. A residual current remained in the inductor 101 through the freewheeling switch unit 108 is returned. The current sense unit 109 senses the residual current and transfers to an input of the error amplifier 106. The error amplifier 106 has a negative feedback control for equalizing an average value of the residual current with an offset current by using the residual current lfw and the offset current inputted, and outputs an error signal. The control unit 107 controls an on-off of the switch unit 102 in the way of PWM (Pulse Width Modulation) or PFM (Pulse Frequency Modulation) by using an error signal outputted from the error amplifier 106, and provides a bucked dc voltage to the output end.

Figure 5:
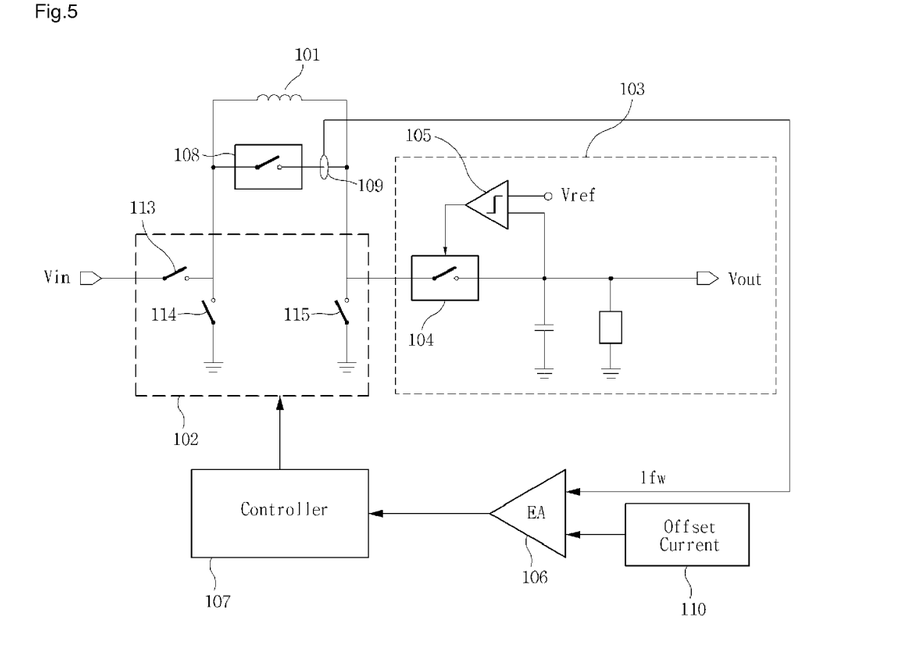
FIG. 5 illustrates a boost-buck type dc/dc converter having a negative feedback control of a residual energy of a current type according to another embodiment of the present invention.

FIG. 5 illustrates a boost-buck type dc/dc converter having a negative feedback control of a residual energy of a current type according to another embodiment of the present invention.

As illustrated in FIG. 5, a boost-buck type dc/dc converter having a negative feedback control of a residual energy of a current type according to another embodiment of the present invention comprises an inductor 101, a switch unit 102, an output unit 103 comprising a output switch unit 104 and a first comparison unit 105, an error amplifier 106, a control unit 107, a freewheeling switch unit 108, a current sense unit 109 and an offset current generation unit 10.

The switch unit 102 is that the first switch 113 is connected electrically between one end of the inductor 101 and an input end Vin, and one end of the second switch 114 is connected electrically between the one end of inductor 101 and the first switch 113, and connects the other end of the inductor 101 to the output switch unit 104, and one end of third switch 115 is connected electrically between the other one of inductor 101 and the output switch unit 104. Besides, the other end of second switch 114 and third switch 115 is connected electrically to a ground voltage.

It illustrates a concrete operation of the boost-buck type dc/dc converter having a negative feedback control of a residual energy of a current type according to another embodiment of the present invention. If the first switch 113 and the third switch unit 115 are on, then an energy is charged in the inductor 101. After some hours is elapsed by the control unit 107, it controls the first switch 113 and the third switch unit 115 to be off and the second switch 114 to be on. An energy charged in the inductor 101 is transferred to the output end. The first comparison 105 compares the output voltage to a reference voltage Vref, and controls the output switch unit to be off when the output voltage is larger than the reference voltage and controls the freewheeling switch unit 108 to be on. A residual current remained in the inductor 101 through the freewheeling switch unit 108 is returned. In this time, the current sense unit 109 senses the residual current and transfers to an input of error amplifier 106, and the error amplifier 106 has a negative feedback control for residual current with an offset current by using the residual current Ifw and the offset current inputted, and outputs an error signal. The control unit 107 controls an on-off of a first switch 113, a second switch 114 and a third switch 115 in the switch unit 102 in the way of PWM (Pulse Width Modulation) or PFM (Pulse Frequency Modulation) by using an error signal outputted from the error amplifier 106, and provides a boosted or bucked dc voltage to the output end.

Figure 6:
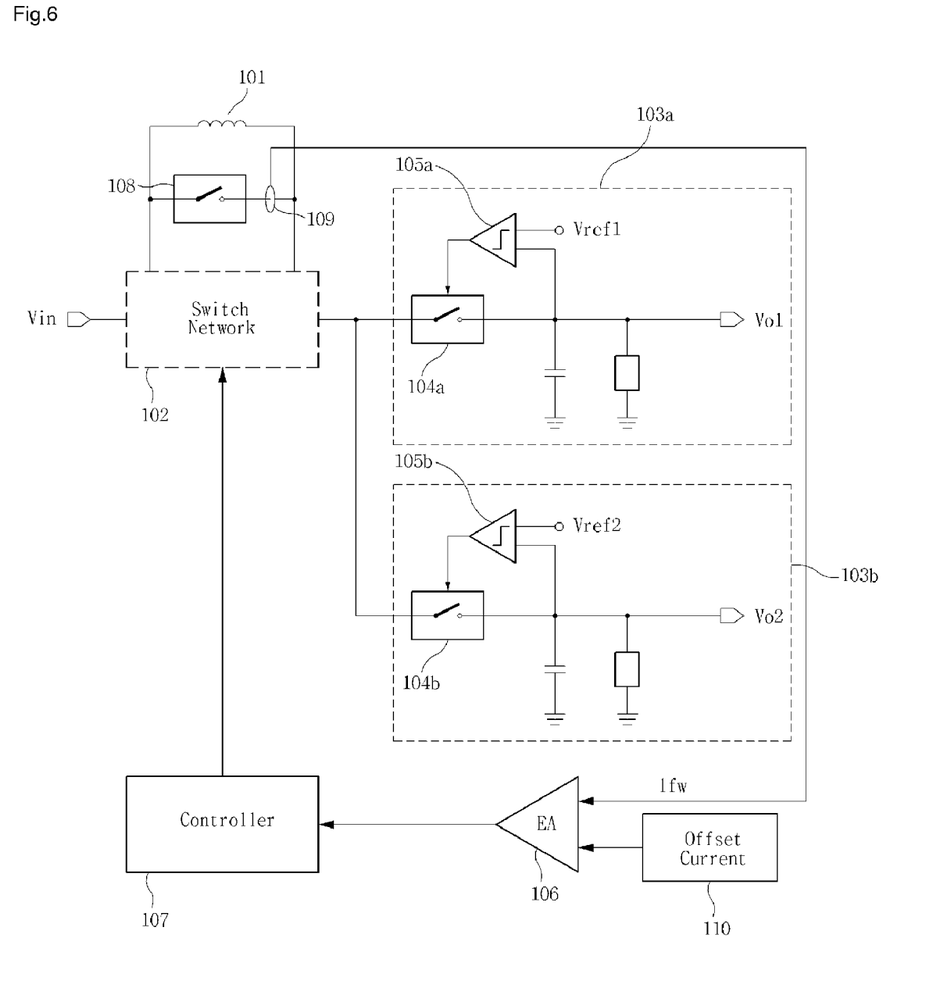
FIG. 6 illustrates a multi output dc/dc converter having a negative feedback control of a residual energy of a current type according to another embodiment of the present invention.

FIG. 6 illustrates a multi output dc/dc converter having a negative feedback control of a residual energy of a current type according to another embodiment of the present invention.

As illustrated in FIG. 6, a multi output dc/dc converter having a negative feedback control of a residual energy of a current type according to another embodiment of the present invention comprises an inductor 101, a switch unit 102, the plurality of output units 103a, 103b comprising a output switch unit 104 and a first comparison unit 105, an error amplifier 106, a control unit 107, a freewheeling switch unit 108, a current sense unit 109 and an offset current generation unit 10.

It illustrates a concrete operation of a multi output dc/dc converter having a negative feedback control of a residual energy of a current type according to another embodiment of the present invention. An energy charged in the inductor 101 is transferred to each of output ends Vo1, Vo2 through the output switch units 104a, 104b, and each of first comparison units 105a, 105b compare each of output voltages to each of reference voltages corresponding to them and control each of output switch units 104a, 104b. If the output switch units 104a, 104b are all off, a residual current remained in the inductor 101 is returned through the free return current switch 108. The current sense unit 109 senses the residual current and transfers to an input of an error amplifier 106, and the error amplifier 106 has a negative feedback control for equalizing an average value of the residual current with an offset current by using the residual current Ifw and the offset current inputted, and outputs an error signal. The control unit 107 controls an on-off of the switch unit 102 in the way of PWM (Pulse Width Modulation) or PFM (Pulse Frequency Modulation) by using an error signal outputted from the error amplifier 106, and provides a boosted or bucked dc voltage to the plurality of output ends Vo1, Vo2.

The output switch units 104a, 104b are desired to be on spontaneously to reduce a ripple voltage in each of output ends.

Besides, the number of output unit is desired to 2 to 30.

Figure 7A:
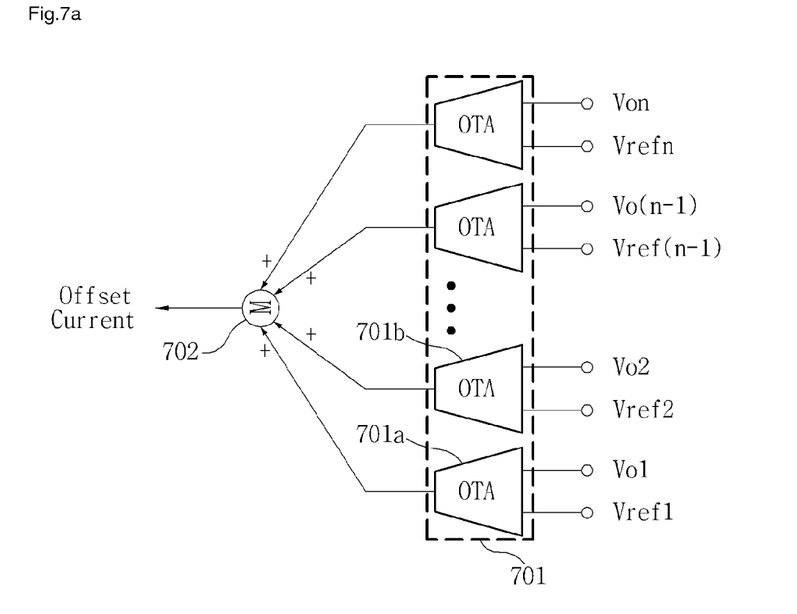
FIGS. 7(a) and (b) illustrate an offset current generation unit of a dc/dc converter having a negative feedback control of a residual energy of a current type.

FIGS. 7(a) and (b) illustrate concretely an offset current generation unit of a dc/dc converter having a negative feedback control of a residual energy of current type of FIG. 2 to FIG. 6.

First of all, referring to FIG. 7(a), the offset current generation unit of a dc/dc converter having a negative feedback control of a residual energy of a current type of FIG. 2 to FIG. 6 comprises the plurality of trans-conductance amplifier 701, OTA which an output voltage Vo1-$n$ of a corresponding output end and a corresponding reference voltage Vref1-$n$ are inputted.

A trans-conductance amplifier 701 signifies an amplifier converting a voltage into a current.

A multi output dc/dc converter in FIG. 6 is desired to comprise each of trans-conductance amplifiers 701a, 701b corresponding to each of outputs, and merges the output current of each of trans-conductance amplifiers 701a, 701b in the mixer 702 and generates an offset current.

Figure 7B:
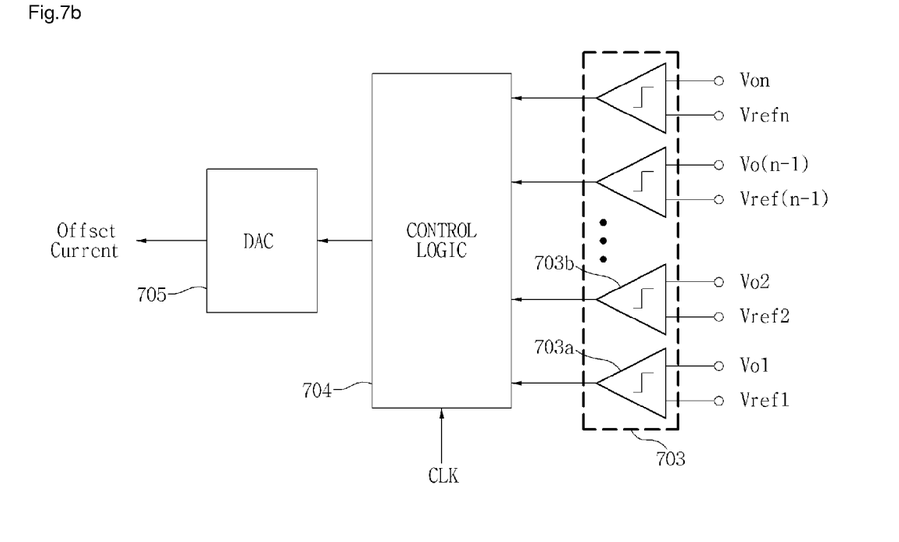

Subordinately, referring to FIG. 7(b), the offset current generation unit of a dc/dc converter having a negative feedback control of a residual energy of a current type of FIG. 2 to FIG. 6 comprises a second comparison unit 703 comparing an output voltage corresponding to output end to corresponding to a reference voltage, a control logic unit 704, and a digital-analog converter 704 (DAC) outputting a current.

A multi output dc/dc converter in FIG. 6 is desired to comprise each of second comparison units 701a, 701b corresponding to each of outputs Vo1, Vo2, and generate the offset current through the control logic unit 704 and DAC 705 using an output data of each of comparison units.

Figure 8:
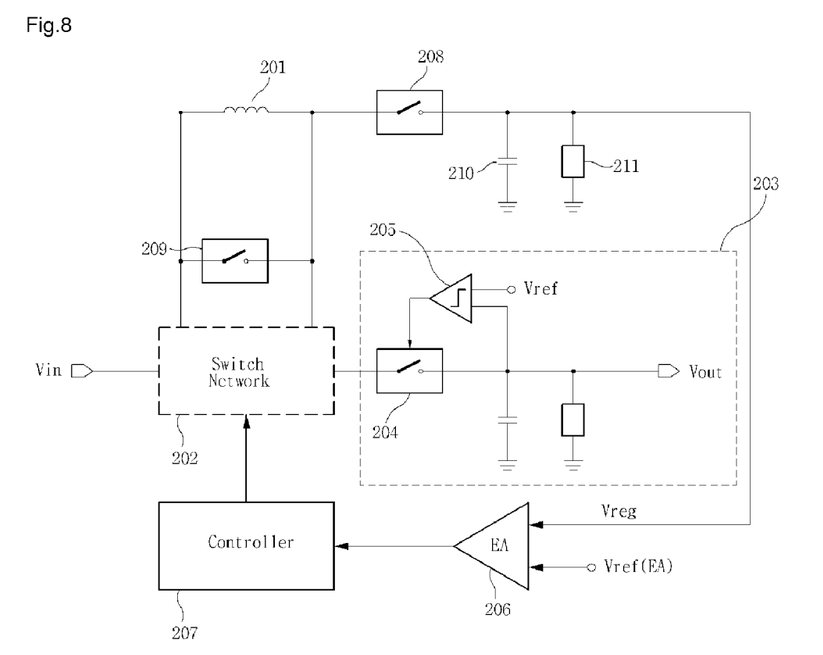
FIG. 8 illustrates a dc/dc converter having a negative feedback control of a residual energy of a voltage type according to another embodiment of the present invention.

FIG. 8 illustrates a dc/dc converter having a negative feedback control of a residual energy of a voltage type according to another embodiment of the present invention.

As illustrated in FIG. 8, a dc/dc converter having a negative feedback control of a residual energy of a voltage type according to another embodiment of the present invention comprises an inductor 201, a switch unit 202, an output unit 203 comprising a output switch unit 204 and a first comparison unit 205, a regulation switch unit 208, a capacitor unit 210, a load unit 211, an error amplifier 206, and a control unit 207.

It illustrates a concrete operation of a dc/dc converter having a negative feedback control of a residual energy of a voltage type according to another embodiment of the present invention. An energy charged in the inductor 201 is transferred to an output end Vout through the output switch unit 204, and the comparison unit 205 compares an output voltage to a reference voltage Vref and controls the output switch unit 204 to be off when the output voltage is larger than the reference voltage. If the output switch unit 204 is off, then the regulation switch unit 208 is on and a residual current remained in the inductor 201 is transferred to the capacitor unit 210. In this time, it is in want of a load unit for a inner consuming 211 in order to maintain a constant voltage by consuming as the residual energy which is transferred. Subordinately, the voltage of both ends of the capacitor unit 210 is transferred to the input of the error amplifier 206, and the error amplifier 206 has a negative feedback control for equalizing a voltage Vreg of both ends of the capacitor unit 210 with a predetermined value Vref(EA) and outputs an error signal. The control unit 207 controls an on-off of the switch unit 202 in the way of PWM (Pulse Width Modulation) or PFM (Pulse Frequency Modulation) by using an error signal outputted from the error amplifier 206, and provides a desired direct current voltage to the output end.

If the freewheeling switch unit 209 is connected electrically to both ends of the inductor 201, then it can prevent from a parasitic resonance. The freewheeling switch unit 209 is desired to use a small sized switch and can omit it.

The load unit 211 is desirably substituted for a real output similar to a load condition.

The dc/dc converter having a negative feedback control of a residual energy of a voltage type according to another embodiment of the present invention as configured above, stores the residual current remained in the inductor 201 in the capacitor unit 210 and has a negative feedback control of the stored energy, thus a characteristic of a load has no effect on a negative feedback loop and responds fast to the fluctuation of the input voltage and the load, and can provide the output voltage stably.

Although it does not illustrated in figures, the switch unit 202 of the dc/dc converter having a negative feedback control of a residual energy of a voltage type according to another embodiment of the present invention is configured as the switch unit 102 illustrated in FIG. 3 to FIG. 5, and can provide a boost type, a buck type or a boost-buck type dc/dc converter having a negative feedback control of the residual voltage of the voltage type.

Besides, as illustrated in FIG. 6, the output unit 203 is configured with the plurality of output units. The plurality of output units are connected in parallel, thus it can provide the dc/dc converter having a negative feedback control of a residual energy of voltage type.

Figure 9:
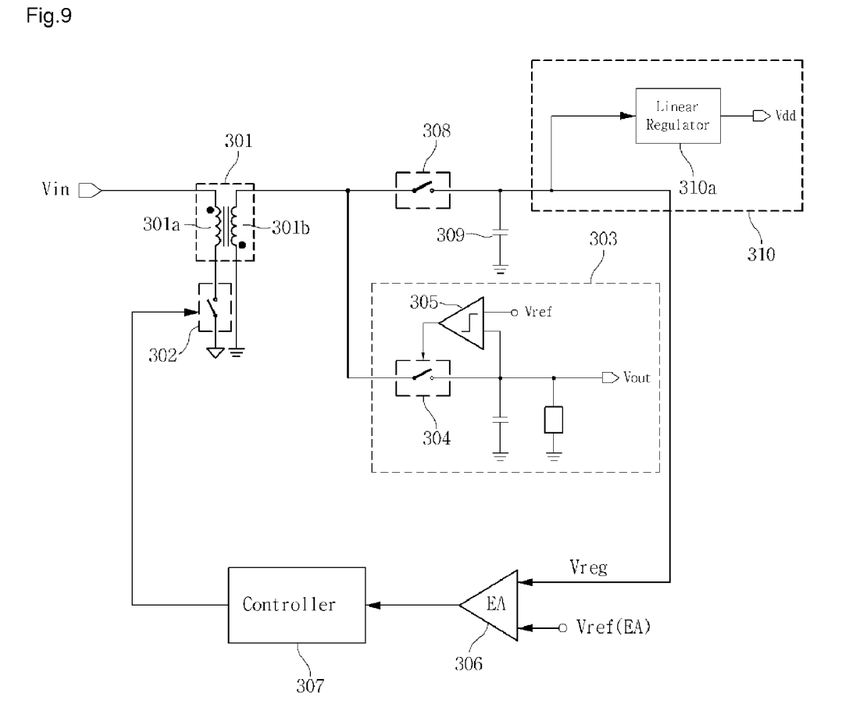
FIG. 9 illustrates a flyback dc/dc converter having a negative feedback control of a residual energy of a voltage type according to another embodiment of the present invention.

FIG. 9 illustrates a flyback dc/dc converter having a negative feedback control of a residual energy of a voltage type according to another embodiment of the present invention.

As illustrated in FIG. 9, a flyback dc/dc converter having a negative feedback control of a residual energy of voltage type according to another embodiment of the present invention comprises a converter 301, a switch unit 302, an output unit 303 comprising an output switch unit 304 and a comparison unit 305, a regulation switch unit 308, a capacitor unit 309, a load unit 310, an error amplifier 306 and a control unit 307.

The load unit 310 can be composed of a linear voltage regulator 310a functioned as a load.

It illustrates a concrete operation of a flyback dc/dc converter having a negative feedback control of a residual energy of a voltage type according to another embodiment of the present invention. An energy charged in a primary coil 301a through an on-off of the switch unit 302 is transferred to the output switch unit 304 by a magnetic coupled secondary coil 301b, and the energy transferred to an output switch unit 304 is transferred to an output end. The comparison unit 305 compares an output voltage to a reference voltage Vref and controls the output switch unit 304 to be off when an output voltage is larger than the reference voltage. If the output switch unit 304 is off, then the regulation switch unit 308 is on, and a residual current remained in the secondary coil 301b is transferred to the capacitor unit 301. The residual energy which is transferred is used in an input of the linear voltage regulator 310a, and it is used in a control source Vdd. The both-ends voltage Vreg of the capacitor unit 309 is transferred to an input of an error amplifier 306 and has a negative feedback control for equalizing with a predetermined value Vref (EA) and outputs an error signal. The control unit 307 controls an on-off of the switch unit 302 in the way of PWM (Pulse Width Modulation) or PFM (Pulse Frequency Modulation) by using an error signal outputted from the error amplifier 306, and converts an dc voltage inputted to an input end into a desired output dc voltage.

The flyback dc/dc converter having a negative feedback control of a residual energy of a voltage type according to another embodiment of the present invention by this configuration stores a residual current remained in the secondary coil 301b into capacitor unit 309 and has a negative feedback control of the stored energy, thus a characteristic of the load has no effect on a negative feedback loop, and it can respond fast to the fluctuation of the input voltage and the load, and also provide the output voltage stably.

Besides, a residual energy is used in the control source of the dc/dc converter, thus it can raise an energy efficiency more.

Figure 10:
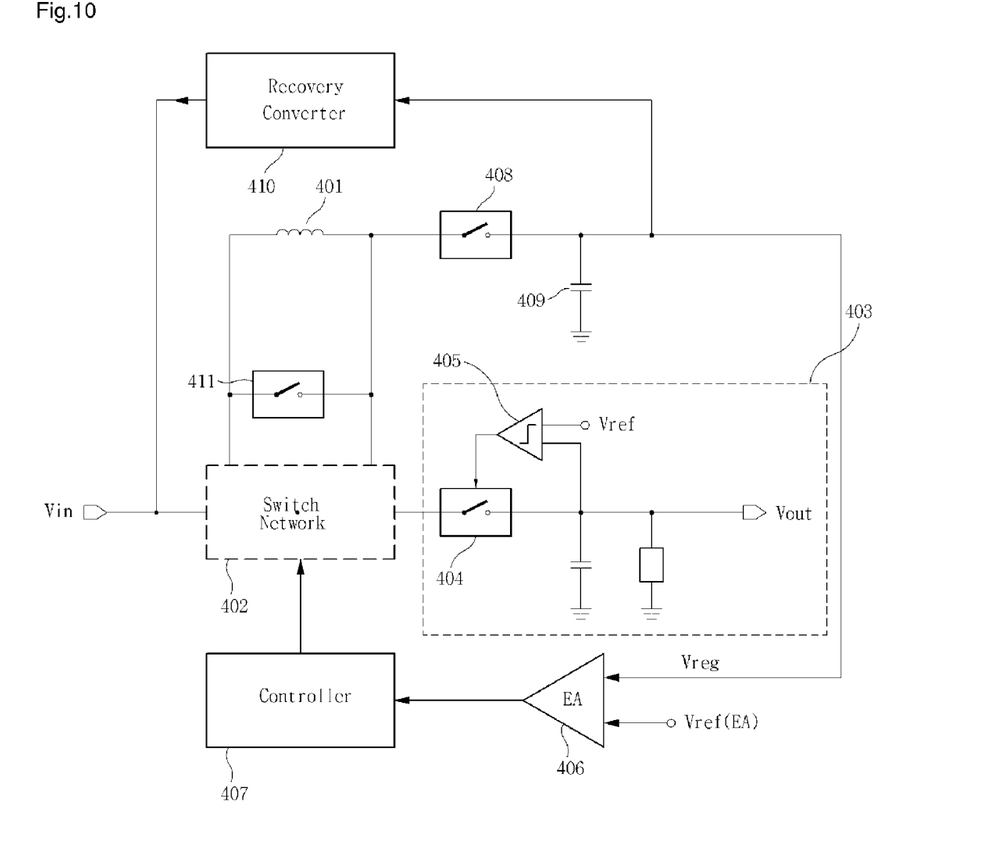
FIG. 10 illustrates a dc/dc converter having a negative feedback control of a residual energy of a voltage type according to another embodiment of the present invention.

FIG. 10 illustrates a dc/dc converter having a negative feedback control of a residual energy of a voltage type according to another embodiment of the present invention.

As illustrated in FIG. 10, a dc/dc converter having a negative feedback control of a residual energy of voltage type according to another embodiment of the present invention comprises an inductor 401, a switch unit 402, an output unit 403 comprising an output switch unit 404 and comparison unit 405, a regulation switch unit 408, a capacitor unit 409, a recovery converter 410, an error amplifier 406 and control unit 407.

It illustrates a concrete operation of a dc/dc converter having a negative feedback control of a residual energy of a voltage type according to another embodiment of the present invention. An energy charged in an inductor 401 is transferred to the output end Vout through the output switch unit 404, and the comparison unit 405 compares an output voltage to a reference voltage Vref and controls the output switch unit 404 to be off when the output voltage is larger than the reference voltage. If the output switch unit 404 is off, then the regulation switch unit 408 is on, and a residual current reminded in the inductor 401b is transferred to the capacitor unit 409 and stored as an energy type. The recovery converter 410 recovers the stored residual energy to an input source. The both-ends voltage Vreg of the capacitor unit 409 is transferred to an input of the error amplifier 406 and has a negative feedback control for equalizing with a predetermined value Vref (EA) and outputs an error signal. The control unit 407 controls an on-off of the switch unit 402 in the way of PWM (Pulse Width Modulation) or PPM (Pulse Frequency Modulation) by using an error signal outputted from the error amplifier 406, and controls an dc voltage inputted to an input end to boost or buck and provides a desired dc voltage to the output end.

The dc/dc converter having a negative feedback control of a residual energy of a voltage type according to another embodiment of the present invention by this configuration stores the residual current of the capacitor unit 409 remained in the inductor 401, and the recovery converter 410 recovers the stored residual energy to an input source, thus it can raise an energy efficiency.

A freewheeling switch unit 411 can be connected to both ends of the inductor 401. The freewheeling switch unit 411 for preventing from a parasitic resonance is desired to use a small sized switch and can omit it.

Figure 11:
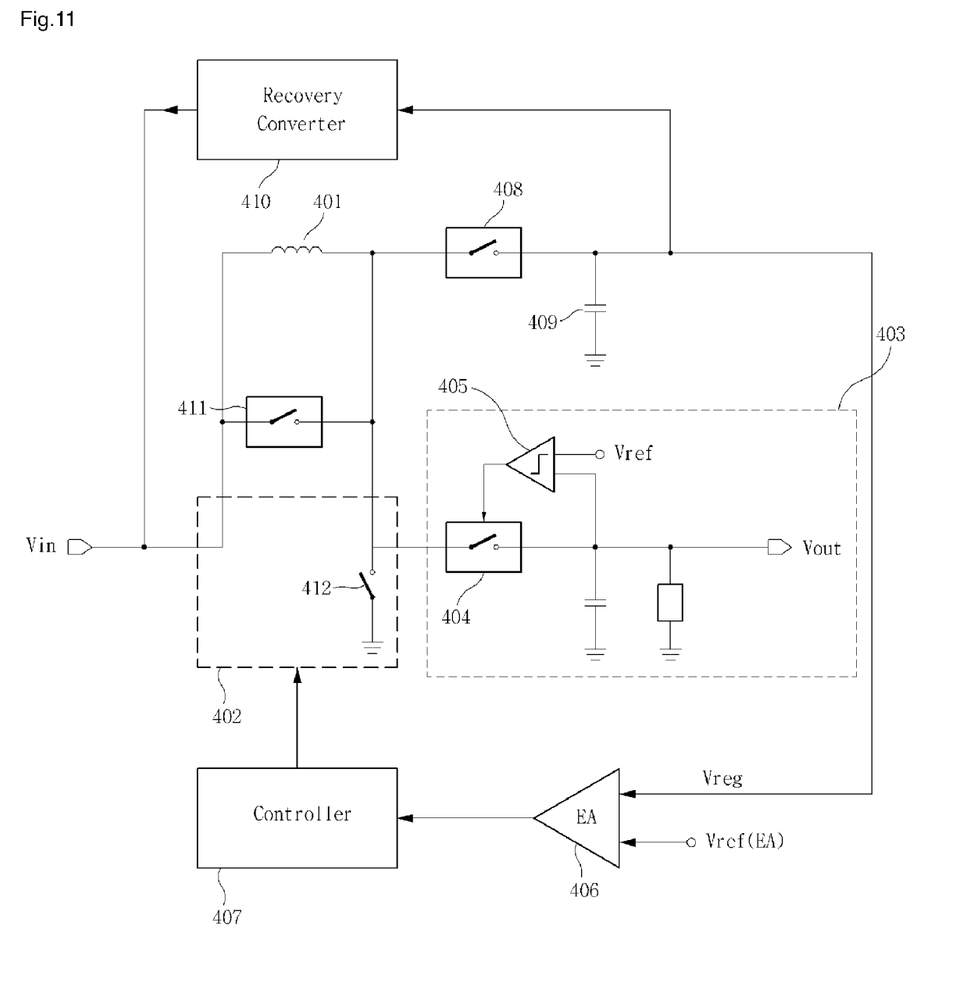
FIG. 11 illustrates a boost-buck type dc/dc converter having a negative feedback control of a residual energy of a voltage type according to another embodiment of the present invention.

FIG. 11 illustrates a boost-buck type dc/dc converter having a negative feedback control of a residual energy of a voltage type according to another embodiment of the present invention.

As illustrated in FIG. 11, the boost-buck type dc/dc converter having a negative feedback control of a residual energy of a voltage type according to another embodiment of the present invention comprises an inductor 401, a switch unit 402, an output unit 403 comprising an output switch unit 404 and comparison unit 405, a regulation switch unit 408, a capacitor unit 409, a recovery converter 410, an error amplifier 406 and a control unit 407.

The switch unit 402 connects electrically one end to an input end Vin and the other end of the inductor 402 to the output switch unit 404, and the one end of a first switch 412 is connected electrically between the other end of the inductor 402 and the output switch unit 404.

It illustrates a concrete operation of a boost-buck type residual energy of a voltage type according to another embodiment of the present invention. An energy charged in the inductor 401 through the first switch 412 is transferred to the output end Vout through the output switch unit 404, and the comparison unit 405 compares an output voltage to a reference voltage Vref and controls the output switch unit 404 to be off when the output voltage is larger than the reference voltage. If the output switch unit 404 is off, then the regulation switch unit 408 is on, and a residual current remained in the inductor 401 is transferred to the capacitor unit 409 and stored as an energy type. The recovery converter 410 recovers the stored residual energy transferred to the capacitor unit 409 to an input source. The both-ends voltage Vreg of the capacitor unit 409 is transferred to an input of the error amplifier 406 and has a negative feedback control for equalizing with a predetermined value Vref (EA) and outputs an error signal. The control unit 407 controls an on-off of the first switch unit 412 in the way of PWM (Pulse Width Modulation) or PFM (Pulse Frequency Modulation) by using an error signal outputted from the error amplifier 406, and provides a desired dc voltage to the output end.

The boost-buck type residual energy of a voltage type according to another embodiment of the present invention controls the reference voltage Vref inputted to the comparison unit 405 and can obtain the boosted or bucked output voltage.

The recovery converter 410 is desired to be implemented as a buck type voltage converter.

A freewheeling switch unit 411 can be connected electrically to both ends of the inductor 401. The freewheeling switch unit 411 for preventing from a parasitic resonance is desired to use a small sized switch and can omit it.

Figure 12:
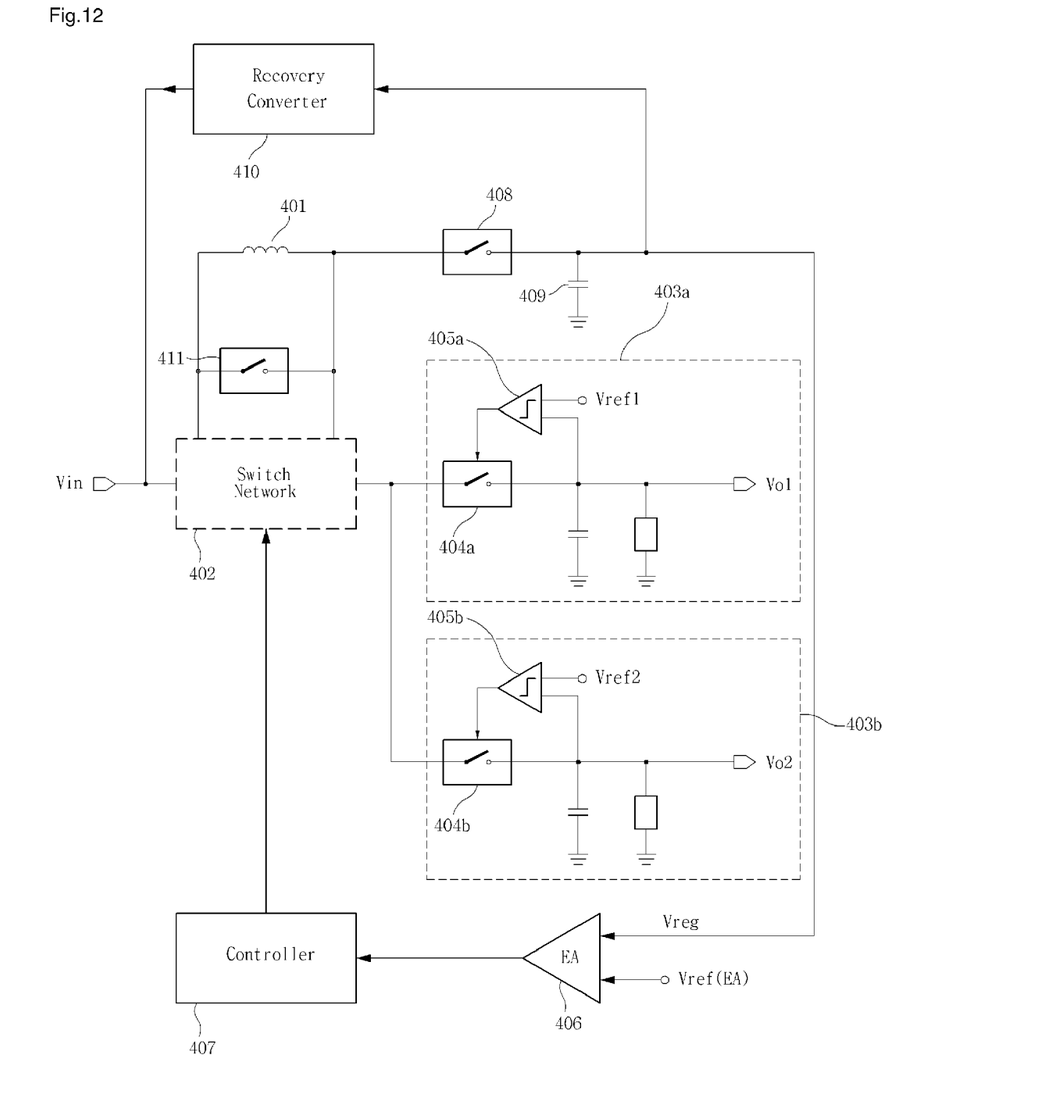
FIG. 12 illustrates a multi output dc/dc converter having a negative feedback control of a residual energy of a voltage type according to another embodiment of the present invention.

FIG. 12 illustrates a multi output dc/dc converter having a negative feedback control of a residual energy of a voltage type according to another embodiment of the present invention.

As illustrated in FIG. 12, the multi output dc/dc converter having a negative feedback control of a residual energy of a voltage type according to another embodiment of the present invention comprises an inductor 401, a switch unit 402, the plurality of output units 403a, 403b comprising an output switch unit 404 and a comparison unit 405, a regulation switch unit 408, a capacitor unit 409, a recovery converter 410, an error amplifier 406 and a control unit 407.

It illustrates a concrete operation of the multi output dc/dc converter having a negative feedback control of a residual energy of a voltage type according to another embodiment of the present invention. An energy charged in an inductor 401 is transferred to the output end Vo1, Vo2 through each of output switch units 404a, 404b, and each of comparison units 405a, 405b compares a corresponding output voltage to a corresponding reference voltage Vref1, Vref2 and controls output switch units 404a, 404b to be off when each of output voltages is larger than the reference voltage. If all of output switch units 404a, 404b are off, then the regulation switch unit 408 is on, and a residual current remained in the inductor 401 is transferred to the capacitor unit 409 and stored as an energy type. The recovery converter 410 recovers the stored residual energy of the capacitor unit 409 to an input source. The both-ends voltage Vreg of the capacitor unit 409 is transferred to an input of the error amplifier 406 and has a negative feedback control for equalizing with a predetermined value Vref (EA) and outputs an error signal. The control unit 407 controls an on-off of the switch unit 402 in the way of PWM (Pulse Width Modulation) or PFM (Pulse Frequency Modulation) by using an error signal outputted from the error amplifier 406, and controls a dc voltage inputted to the input end to boost or buck and provides the plurality of desired dc voltages to the plurality of output ends Vo1, Vo2.

A freewheeling switch unit 411 can be connected electrically to both ends of the inductor 401. The freewheeling switch unit 411 for preventing from a parasitic resonance is desired to use a small sized switch and can omit it.

The invention being described above, the present invention can provide a dc/dc converter that a characteristic of a load has no effect on a negative feedback loop.

Besides, it can provide the dc/dc converter which responds fast to a fluctuation of an input voltage or a load.

Besides, it can provide the dc/dc converter which can provide an output voltage stably.

Although various embodiments/implementations of the present invention are described with reference to the accompanying drawings, it will be apparent for those skilled in the art that the technical configuration of the present invention can be embodied in various forms without modifying the scope and critical characteristics of the present invention.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What is claimed is:

1. A dc/dc converter comprising:
an inductor;
a switch unit connected to both ends of the inductor;
an output unit comprising an output switch unit outputting the energy charged in the inductor into an output end and a first comparison unit controlling an on-off of the output switch unit;
a freewheeling switch unit connected to both ends of the inductor and returning a residual current remained in the inductor;
a current sense unit sensing the residual current;
an offset current generation unit generating an offset current;
an error amplifier comparing the residual current inputted from the current sense unit to the offset current generated in the offset current unit and outputting an error signal; and
a control unit controlling the switch unit by using the error signal inputted from the error amplifier.

2. The dc/dc converter of claim 1, wherein the switch unit connects electrically one end of the inductor to an input end and the other end of the inductor to an output switch unit, and one end of a first switch connected electrically between the other end of the inductor and the output switch unit.

3. The dc/dc converter of claim 2, wherein the control unit controls an on-off of the first switch.

4. The dc/dc converter of claim 1, wherein the switch unit is that a first switch is connected electrically between the one end of inductor and an input end, and a second switch is connected electrically between the one end of the inductor and a ground voltage, and connects electrically the other one of inductor and the output switch unit.

5. The dc/dc converter of claim 4, wherein the control unit controls an on-off of the first switch and the second switch.

6. The dc/dc converter of claim 1, wherein the switch unit is that a first switch is connected electrically between the one end of inductor and an input end, and a second switch is connected electrically between the one end of inductor and a ground voltage, and connects electrically the other one of inductor and the output switch unit, and one end of a third switch is connected between the other end of the inductor and the ground voltage.

7. The dc/dc converter of claim 6, wherein the control unit controls the first switch, the second switch, and the third switch.

8. The dc/dc converter of claim 1, wherein the output unit is connected over two parallel.

9. The dc/dc converter of claim 1, wherein the offset current generation unit comprises a trans-conductance amplifier.

10. The dc/dc converter of claim 1, wherein the offset current generation unit comprises: a second comparison unit comparing the output voltage of the output end to a predetermined reference voltage and outputting a comparison signal; a control logic unit outputting a control signal by using the comparison signal inputted from the second comparison unit; and a digital-analog converter generating the offset current by using the control signal inputted from the control logic unit.

11. A dc/dc converter comprising:
an inductor;
a switch unit connected to both ends of the inductor;
an output unit comprising an output switch unit outputting the energy charged in the inductor into an output end and a first comparison unit controlling an on-off of the output switch unit;
a control switch unit connected electrically to the inductor;
a capacitor unit connected to the control switch unit and storing an energy remained in the inductor;
a load unit consuming an energy stored in the capacitor unit;
an error amplifier comparing both-ends voltage of the capacitor unit inputted from the capacitor unit to a reference voltage and outputting an error signal; and
a control unit controlling the switch unit by using the error signal inputted from the error amplifier.

12. The dc/dc converter of claim 11, further comprising a freewheeling switch unit connected to both ends of the inductor.

13. The dc/dc converter of claim 11, wherein the switch unit connects electrically one end of the inductor to an input end and the other end of the inductor to an output switch unit, and one end of a first switch connected electrically between the other end of the inductor and the output switch unit.

14. The dc/dc converter of claim 13, wherein the control unit controls an on-off of the first switch.

15. The dc/dc converter of claim 11, wherein the switch unit is that a first switch is connected electrically between the one end of inductor and an input end, and one end of a second switch is connected electrically between the one end of inductor and the first switch, and connects electrically the other one of inductor and the output switch unit.

16. The dc/dc converter of claim 15, wherein the control unit controls an on-off of the first switch and the second switch.

17. The dc/dc converter of claim 11, wherein the switch unit is that a first switch is connected electrically between the one end of the inductor and an input end, and one end of a second switch is connected electrically between the one end of the inductor and the first switch, and connects electrically the other one of inductor and the output switch unit, and one end of a third switch is connected between the other end of inductor and the output switch unit.

18. The dc/dc converter of claim 17, wherein the control unit controls the first switch, the second switch, and the third switch.

19. The dc/dc converter of claim 11, wherein the output unit is connected over two parallel.

20. A dc/dc converter comprising:
a transformer;
a switch unit connected electrically to a primary coil of the transformer and storing an energy;
an output unit comprising an output switch unit transferring a energy stored in a secondary coil of the transformer and a comparison unit controlling the output switch unit;
a regulation switch unit connected electrically to the secondary coil;
a capacitor unit connected electrically to the regulation switch unit and storing an energy remained in the secondary coil;
a load unit consuming an energy stored in the capacitor unit;
an error amplifier comparing both-ends voltage of the capacitor unit inputted from the capacitor unit to a reference voltage and outputting an error signal; and
a control unit controlling the switch unit by using the error signal inputted from the error amplifier.

21. The dc/dc converter of claim 20, wherein the load unit comprises a linear voltage regulator outputting a control voltage by using a stored energy of the capacitor unit inputted from the capacitor unit.

22. The dc/dc converter of claim 20, wherein the output unit is connected over two parallel.

23. A dc/dc converter comprising:
an inductor;
a switch unit connected to both ends of the inductor;
an output unit comprising an output switch unit outputting the energy charged in the inductor into an output end and a comparison unit controlling an on-off of the output switch unit;
a regulation switch unit connected electrically to the inductor;
a capacitor unit connected to the control switch unit and storing an energy remained in the inductor;
a recovery converter recovering an energy stored in the capacitor unit to an input end;
an error amplifier comparing both-ends voltage of the capacitor unit inputted from the capacitor unit to a reference voltage and outputting an error signal; and
a control unit controlling the switch unit by using the error signal inputted from the error amplifier.

24. The dc/dc converter of claim 23, further comprising a freewheeling switch unit connected to both ends of the inductor.

25. The dc/dc converter of claim 23, wherein the switch unit connects electrically one end of the inductor to an input end and the other end of the inductor to an output switch unit, and one end of a first switch connected electrically between the other end of the inductor and the output switch unit.

26. The dc/dc converter of claim 25, wherein the control unit controls an on-off of the first switch.

27. The dc/dc converter of claim 24, wherein the output unit is connected over two parallel.

* * * * *